United States Patent
Raghavan et al.

(10) Patent No.: US 10,477,417 B2
(45) Date of Patent: Nov. 12, 2019

(54) BEAM SELECTION IN MILLIMETER WAVE SYSTEMS

(71) Applicant: QUALCOMM Incorporated, San Diego, CA (US)

(72) Inventors: Vasanthan Raghavan, West Windsor Township, NJ (US); Valentin Alexandru Gheorghiu, Tokyo (JP); Jung Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/121,204

(22) Filed: Sep. 4, 2018

(65) Prior Publication Data

US 2019/0082332 A1 Mar. 14, 2019

Related U.S. Application Data

(60) Provisional application No. 62/556,970, filed on Sep. 11, 2017.

(51) Int. Cl.
| | |
|---|---|
| *H04W 24/04* | (2009.01) |
| *H04W 24/02* | (2009.01) |
| *H04B 7/0408* | (2017.01) |
| *H04B 7/06* | (2006.01) |
| *H04B 7/08* | (2006.01) |
| *H04B 17/309* | (2015.01) |
| *H04W 36/00* | (2009.01) |

(52) U.S. Cl.
CPC .......... *H04W 24/02* (2013.01); *H04B 7/0408* (2013.01); *H04B 7/0695* (2013.01); *H04W 24/04* (2013.01); *H04B 7/088* (2013.01); *H04B 17/309* (2015.01); *H04W 36/00835* (2018.08)

(58) Field of Classification Search
CPC .............................. H04W 24/02; H04B 7/0408
See application file for complete search history.

(56) References Cited

U.S. PATENT DOCUMENTS

| | | | |
|---|---|---|---|
| 2011/0110453 A1 | 5/2011 | Prasad et al. | |
| 2014/0073329 A1 | 3/2014 | Kang et al. | |
| 2016/0192382 A1* | 6/2016 | Soldati | H04W 72/1231 370/329 |
| 2016/0218779 A1* | 7/2016 | Lee | H04B 7/0413 |
| 2017/0214444 A1 | 7/2017 | Nigam et al. | |
| 2019/0044589 A1* | 2/2019 | Park | H04B 7/0456 |
| 2019/0082331 A1 | 3/2019 | Raghavan et al. | |

OTHER PUBLICATIONS

International Search Report and Written Opinion—PCT/US2018/049605—ISA/EPO—dated Jan. 3, 2019.

* cited by examiner

*Primary Examiner* — Chuong A Ngo
(74) *Attorney, Agent, or Firm* — Qualcomm Incorporated

(57) ABSTRACT

A beam selection method and apparatus suitable for millimeter wave (mmW) communication systems is disclosed. In one aspect, a user equipment (UE) may perform a beam sweep procedure to identify suitable downlink beams candidates from one or more gNBs. The UE may generate a beam list by selecting some of the downlink beams for active tracking. When beams on the beam list become unavailable, the UE may compare the number of available beams on the beam list with a threshold value. If the number of available beams falls below the threshold, the UE may perform another beam sweep procedure.

21 Claims, 11 Drawing Sheets

BEAM SELECTION IN MILLIMETER WAVE SYSTEMS

This application claims the benefit of U.S. Patent Application Ser. No. 62/556,970 entitled "BEAM SELECTION IN MILLIMETER WAVE SYSTEMS" filed on Sep. 11, 2017, which is expressly incorporated by reference herein in its entirety.

BACKGROUND

The following relates generally to wireless communication, and more specifically to User Equipment (UE) beam search and selection in millimeter wave systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations (e.g., a gNB, TRP, eNB) or other network access network nodes, each simultaneously supporting communication for multiple communication devices, which may be otherwise known as user equipment (UE).

In some wireless systems, base stations and UEs may communicate using directional transmissions (e.g., beams), where beamforming techniques may be applied using one or more antenna arrays to generate beams in different directions. For example, a base station may transmit downlink communications (e.g., synchronization signals, signals, data signals, etc.) to a UE using a transmit beam in a particular direction, and the UE may in turn receive the downlink communications on a receive beam in an opposite direction. In very high frequency systems a base station may transmit using narrow beams to overcome path loss. A UE may be able to receive on many suitable down-like beams from one or more gNBs. Searching and tracking a large amount of beams increases complexity and consumes modem and RF power. It may thus be desirable to improve techniques for downlink beam selection in beamformed communication systems.

SUMMARY

Beam training and beam selection in mmW systems is important. Beam training procedures take time, power, and increase modem complexity. Moreover beam training may reveal that there are many suitable beams that are available to the UE. Tracking, refining and reporting on many beams also increases time, power and modem complexity.

Disclosed are various methods and apparatuses for executing beam search procedures and generating UE beam lists for tracking. One aspect features a beam list generated from a beam training procedure. The beam list contains beams (or beam pairs) that the UE may use for tracking. The UE may identify suitable beams for use and if the number of suitable beams falls below a threshold number the UE may perform another beam training procedure. Other aspects include a beam list featuring beams from multiple gNB. In various aspects, the beams chosen for inclusion on the beam list may be chosen using a variety of different criteria. The beam list provides the UE with beams (or beam pairs) for tracking. Tracking multiple beams is important in case of beam blockage or link signal degradation or outage.

DETAILED DESCRIPTION

Figure 1:
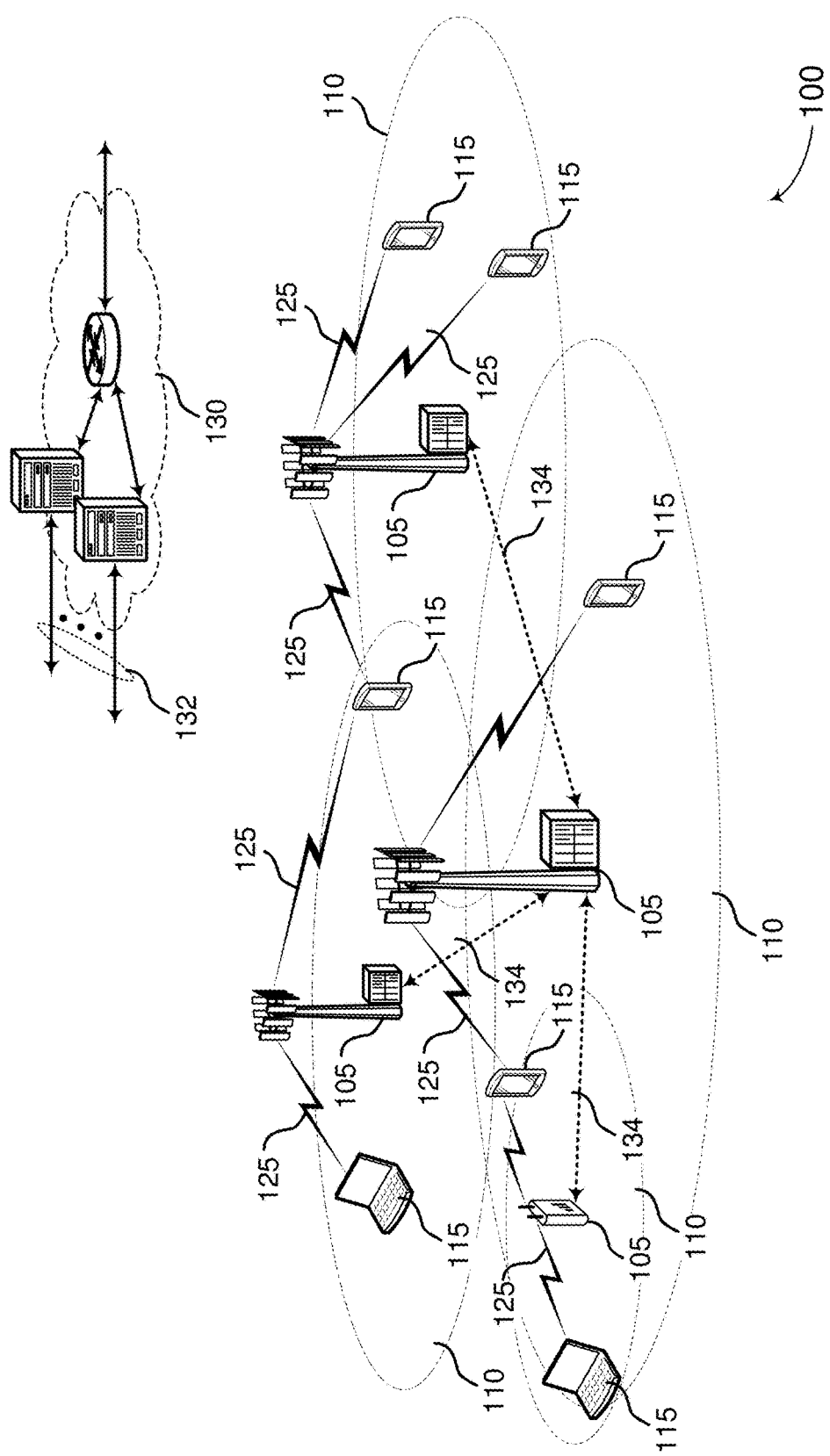
FIG. 1 illustrates an example of a system for wireless communication that supports mmW beam selection in accordance with aspects of the present disclosure.

Some wireless communication systems may support beamformed transmissions between a base station and a user equipment (UE). For example, some systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, 8 antenna ports) associated with arrays of antennas to form beams in various directions using a number of analog weight factors. For example, as a base station transmits downlink signals using directional beams, a UE may also utilize beamforming for the UE's own directional receive beams (and its uplink transmit beams for uplink transmissions to the base station).

A gNB may transmit SS blocks, CSI-RS signals or other downlink beam signals on different directional downlink transmit beams. An SS block may be a combination of Primary Synchronization Signals (PSS), Secondary Synchronization Signals (SSS) and/or Primary Broadcast Channel Signals (PBCH). The PBCH may have Demodulation Reference Signals (DMRS) embedded in them. The transmit beams may, over time, cover the geographic coverage area of a cell allowing a UE inside the cell to synchronize with the downlink transmit beams.

A UE in a serving cell may perform a beam training operation to determine synchronization signals associated with different downlink beams that can be received and decoded. The UE may consider these beams as candidates for a beam list that will be used for beam tracking purposes. The list may also contain a receive beam for receiving the downlink beams forming a beam pair. It can be appreciated that a UE may want a beam list with multiple beam pairs to track in case of a blocking event that would render one or more beam pairs unusable. It can also be appreciated that tracking multiple beams increases complexity, power usage, and modem complexity. Accordingly, it may be important to limit or proactively manage the number of beams on the beam list. The beam list may vary and result in different operating characteristics.

Moreover, beam training also increases complexity, power usage and mode complexity. Accordingly it may make sense to limit beam training events. In one aspect, a UE in a serving cell may limit beam training by limiting beam searches and performing a beam search only when the number of useful beams in the beam list falls below a threshold. The threshold may be determined by the UE and/or the gNB based on a variety of factors.

In some aspects, the UE may put beams from multiple gNB on its beam list providing rate and spatial diversity. In some aspects, serving cell beams on the beam list may be limited to a small number (e.g. 1 to 3 beams). These beams might be chosen for example to correspond to UE beams in different subarrays indicating correspondence to other clusters in the channel. In some aspects the beam list may be generated based on UE distance to the gNB transmitting the beam. The UE might for example favor beams that are a short distance to the gNB with the number of beams from each gNB being an inverse function of the distance. Various techniques such as triangulation may be used to estimate distances.

Beam lists may also be populated or refined using other criteria. For example, a UE may favor beams that allow for detection and reasonable demodulation performance with pseudo-omnidirectional (PO) beams allowing the UE to save power. In some aspects, UEs may also request that a gNB use a coarser codebook reducing the UE power requirements and Adjacent Channel Leakage Ratio (ACLR) levels.

Aspects of the disclosure are initially described in the context of a wireless communications system. Examples are also provided which describe various transmit and receive beam configurations for which efficient transmit power control may be applied using one or more RACH beam transmission counters. Aspects of the disclosure are further illustrated by and described with reference to apparatus diagrams, system diagrams, and flowcharts that relate to uplink transmit power control during random access procedures.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use beam training procedures allowing UEs 115 to determine gNB 105 beams that may be paired with one or more UE beams. UEs 115 may select some of these beam pairs for inclusion on a beam list.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as gNBs 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 115 may receive one or more system information blocks (SIBs). For example, SIB1 may contain cell access parameters and scheduling information for other SIBs. For instance, SIB1 access information, including cell identity information, and it may indicate whether a UE 115 is allowed to camp on a coverage area 110. SIB1 also includes cell selection information (or cell selection parameters) and scheduling information for other SIBs, such as SIB2. Decoding SIB1 may enable the UE 115 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell radio network temporary identifier (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

Wireless devices in wireless communications system 100 may send transmissions in accordance with a certain link budget. The link budget may account for allowed signal attenuation between a UE 115 and a base station 105, as well as antenna gains at the UE 115 and base station 105.

Accordingly, the link budget may provide, for example, a maximum transmit power for the various wireless devices within wireless communications system 100. In some cases, a UE 115 may coordinate transmit power with a serving base station 105 to mitigate interference, improve the uplink data rate, and prolong battery life.

Uplink power control may include a combination of open-loop and closed-loop mechanisms. In open-loop power control, the UE transmit power may depend on estimates of the downlink path-loss and channel configuration. In closed-loop power control, the network may directly control the UE transmit power using explicit power-control commands. Open-loop power control may be used for initial access, such as the transmission of a physical random access channel (PRACH) by a UE 115, whereas both open and closed loop control may be used for uplink control and data transmission. A UE 115 may determine power using an algorithm that takes into account a maximum transmission power limit, a target base station receive power, path loss, modulation and coding scheme (MCS), the number of resources used for transmission, and a format of the transmitted data (e.g., physical uplink control channel (PUCCH) format). Power adjustments may be made by a base station 105 using a transmit power command (TPC) messages, which may incrementally adjust the transmit power of a UE 115 as appropriate.

Figure 2:
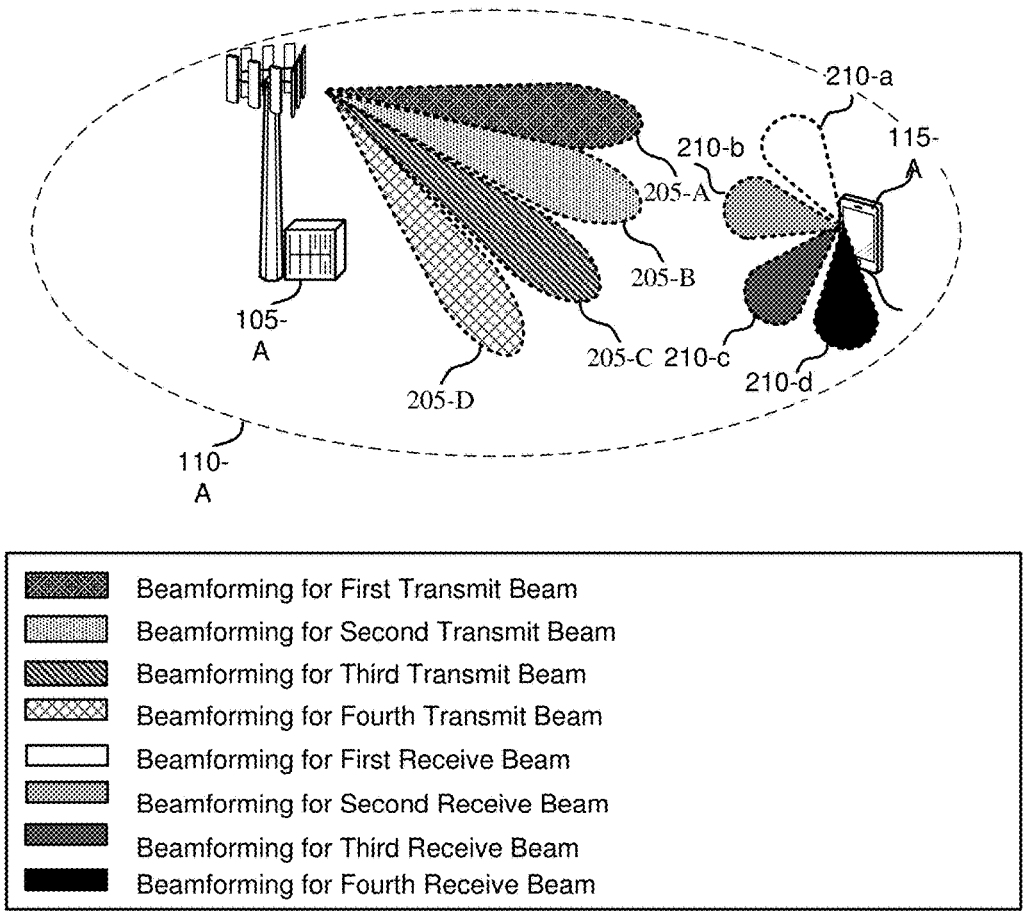
FIG. 2 illustrates an example of a wireless communications system that supports mmW beam selection in accordance with aspects of the present disclosure.

FIG. 2 illustrates an example of a wireless communications system 200 that supports mmW beam selection in accordance with various aspects of the present disclosure. In some examples, wireless communications system 200 may implement aspects of wireless communications system 100. For example, wireless communications system may include a base station 105-*a* and a UE 115-*a*, which may be examples of the corresponding devices described with reference to FIG. 1. Wireless communications system 200 may support beam selection based on array gains for transmit and receive beams at UE 115-*a*, enabling efficient power adjustment techniques for transmitting random access transmissions.

Wireless communications system 200 may support beamformed transmissions between base station 105-*a* and UE 115-*a*. For example, wireless communications system 200 may operate using multiple communication beams (e.g., in mmW frequency ranges). As a result, signal processing techniques, such as beamforming may be used to combine energy coherently and, for example, overcome path losses. By way of example, base station 105-*a* may utilize multiple antennas, and each antenna may transmit (or receive) a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the cell coverage area 110-*a* of the base station 105-*a* or otherwise benefit wireless communications system 200.

Base station 105*a* may include downlink beams 205 for communication and UE 115*a* may also include receive beams 210 for transmitting and receiving synchronization signals. Beams 205 and beams 210 may also represent examples of directional beams over which data (or control information) may be transmitted and/or received. Accordingly, each beam 205 may be directed from base station 105*a* toward a different region of the coverage area 110-*a* and in some cases, two or more of beams 205 and 210 may overlap. Beams 205 and 210 may also be utilized simultaneously or at different times.

In some cases, a mapping may exist between a beam 210 used to receive downlink transmissions (e.g., a UE receive beam 210-*a*) and a beam 210 used for sending uplink transmissions (e.g., a UE transmit beam 210-*b*). For example, base station 105*a* may send a downlink transmission using beam 205-*a* and UE 115*a* may receive the downlink transmission using downlink receive beam 210-*b*. Based on the use of receive beam 210-*a* for the downlink transmission, UE 115*a* may then map a corresponding uplink transmit beam 210-*b* for sending an uplink transmission to base station 105-*a*, thereby creating a beam pair. In such cases, UE 115*a* may be said to have beam correspondence. In other cases, UE 115*a* may not have beam correspondence. For instance, base station 105*a* may send a downlink transmission using beam 205-*a* and UE 115*a* may receive the downlink transmission on, for example, one or more sidelobes corresponding to receive beam 210-*a*, or on receive beam 210-*b*. UE 115-*a* may then use another beam 210, that may not correspond (i.e., a mapping does not exist) to downlink receive beam 210-*a* when sending an uplink transmission. In such cases, UE 115*a* may have been unable to determine a beam pairing based on the angle of arrival of the downlink transmission or based on the downlink transmission being received in a different direction than receive beam 210-*a*.

A systematic search procedure may be used to identify beams transmit beams and receive beam pairs. Base station 105*a* may transmit synchronization signals (SS) in blocks on different downlink beams. Synchronization signals may be sent for example on transmit beam 205-*a*, followed by transmit beam 205-*b*, followed by transmit beam 205-*c*, followed by transmit beam 305-*d* and so on until all SS blocks are sent. UE 115*a* may also monitor the downlink beams on different receive beams. The UE for example may attempt to receive SS transmit beams on receive beam 210-*a*, followed by receive beam 210-*b*, followed by receive beam 210-*c*, followed by receive beam 210-*d*. The UE may decode the received SS signals and determine a Signal to Interference and Noise Ratio (SINR). A beam list can be generated, and stored in memory, for example by determining which beam pairs have a SINR suitable or useful for communication.

In one aspect, SS blocks corresponding to different downlink beams used by the base station 105*a* may be 4 SS blocks for 0-3 GHz transmissions, 8 SS blocks for 3-6 GHz transmissions and 64 SS blocks for 6 GHz and higher transmissions.

Figure 3:
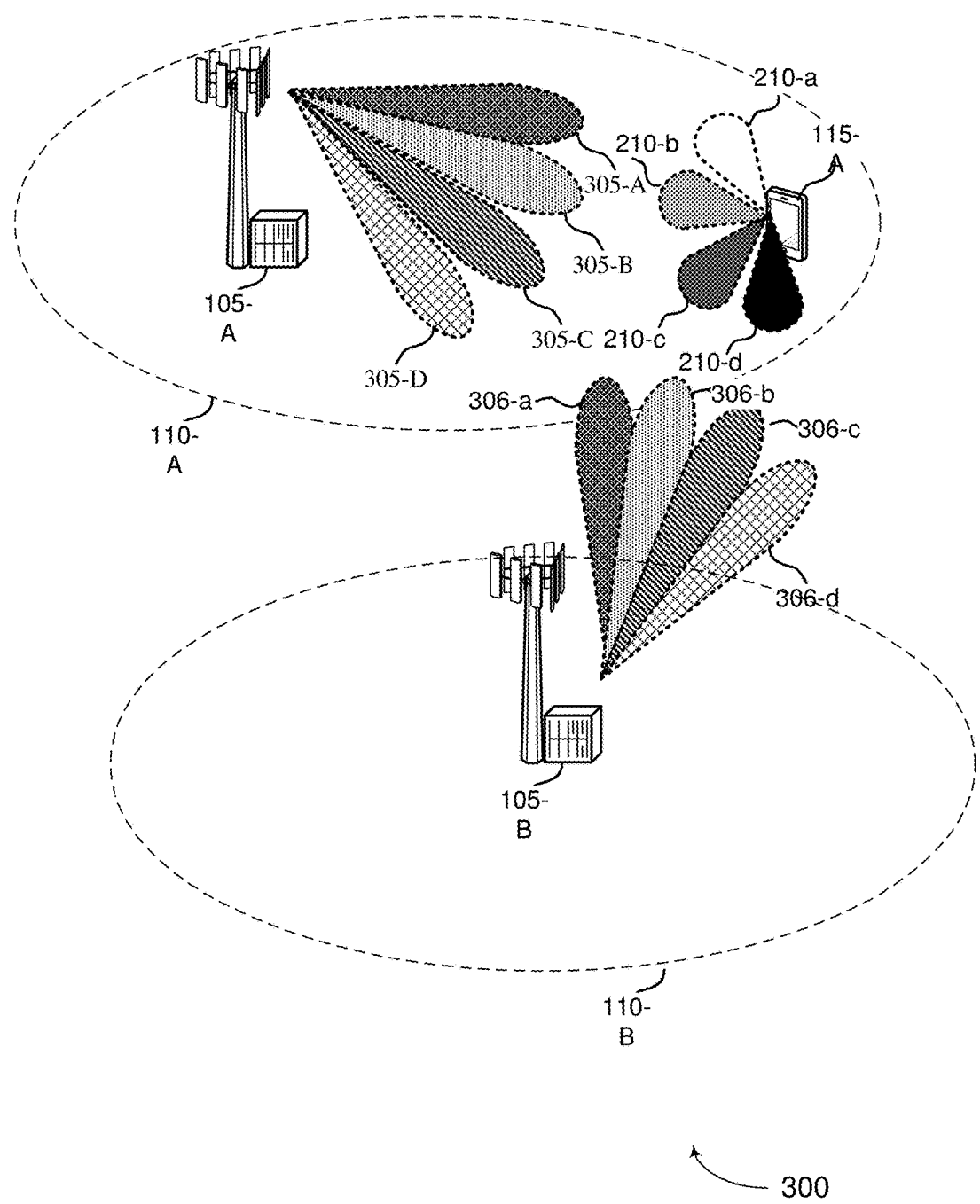
FIG. 3 illustrates an example of a wireless communications system that supports mmW beam selection in accordance with aspects of the present disclosure.

FIG. 3 illustrates an example of a wireless communications system 300 that supports mmW beam selection in accordance with aspects of the present disclosure. In this example UE 115*a* is in cell coverage area 110-*a*, that may be considered the UEs serving cell. UE-115*a* may also able to receive downlink signals from base station 105-*b* that has a different cell coverage area 110-*b*. In this example, a systematic search may be used to determine beams from both gNB 105*a* and gNB 105-*b* that may be placed in a beam list. In this case, UE 115*a* will monitor synchronization blocks from both gNB 105*a* and gNB 105-*b*. In one aspect, each gNB may run through all its transmit beams and the UE may scan through each receive beam to identify suitable beam pairs for possible inclusion on the beam list. In various aspects, gNB 105*a* and gNB 105-*b* may transmit their SS blocks simultaneously. In this example, gNB 105*a* and gNB 105-*b* transmit SS blocks on each of its corresponding beams simultaneously. UE 115*a* may incrementally scan through each receive beams searching for SS signals. The UE may then select suitable beam pairs according to one or more criterion for placement on the beam list.

gNB 105a and gNB 105-b may for example transmit on 64 SS blocks associated with downlink beams (all downlink beams not shown) that cover in azimuth their respective cell coverage areas 110. gNB 105a may transmit each SS block including the four SS blocks associated with the four consecutive transmit beams shown, transmit beam 305-a, transmit beam 305-b, transmit beam 305-c, and transmit beam 305-d. Simultaneously, gNB 105-b may transmit each corresponding SS block including the four SS blocks associated with four consecutive transmit beams shown, transmit beams 306-a, 306-b, 306-c, 306-d. UE 115a may scan through its receive beams (all receive beams not shown) including the four consecutive receive beams shown, receive beams 210-a, 210-b, 210-c and 210-d. The UE may then determine which beams should be placed in the beam list.

In one aspect, the UE may choose not to include any beams from gNB 105-a in the beam list since it is the serving cell gNB. The beams from gNB-b may be chosen for inclusion in the beam list since they correspond to different clusters in the environment providing rate and diversity improvement. In another aspect, the UE may choose to include a small number of beams (e.g. 1, 2 or 3 beams) from serving cell 110-a in the beam list. The beams may be chosen to correspond to different subarrays thereby indicating correspondence to other clusters in the channel.

In another aspect the UE can manage the number of candidate beams from gNB-a 105a and gNB 105-b based on their respective distances to the UE. Beam management may include limiting the range of the beams. These distances may be estimated by triangulation or other methods. The UE may then determine the number of gNB-a beams and the number of gNB-b beams to be placed on the beam list as an inverse function of their respective distance from the UE.

In yet another aspect, gNB beams may be selected for inclusion on the beam list if they allow data detection and reasonable demodulation performance using UE PO beams. PO beams may allow the UE to consume less power than narrower UE beams. In another aspect the UE may request gNB 105a or gNB 105-b to use a coarser code book. This may help to reduce UE energy consumption and ACLRs levels.

It can also be appreciated that the beams selected for inclusion on the beam list may be selected using a variety of different criteria. Other criterion that may be used include Reference Signal Receive Power (RSRP). Reference Signal Receive Quality (RSRQ), Received Signal Strength Indication (RSSI), and/or Signal to Noise Ratio (SNR).

Figure 4:
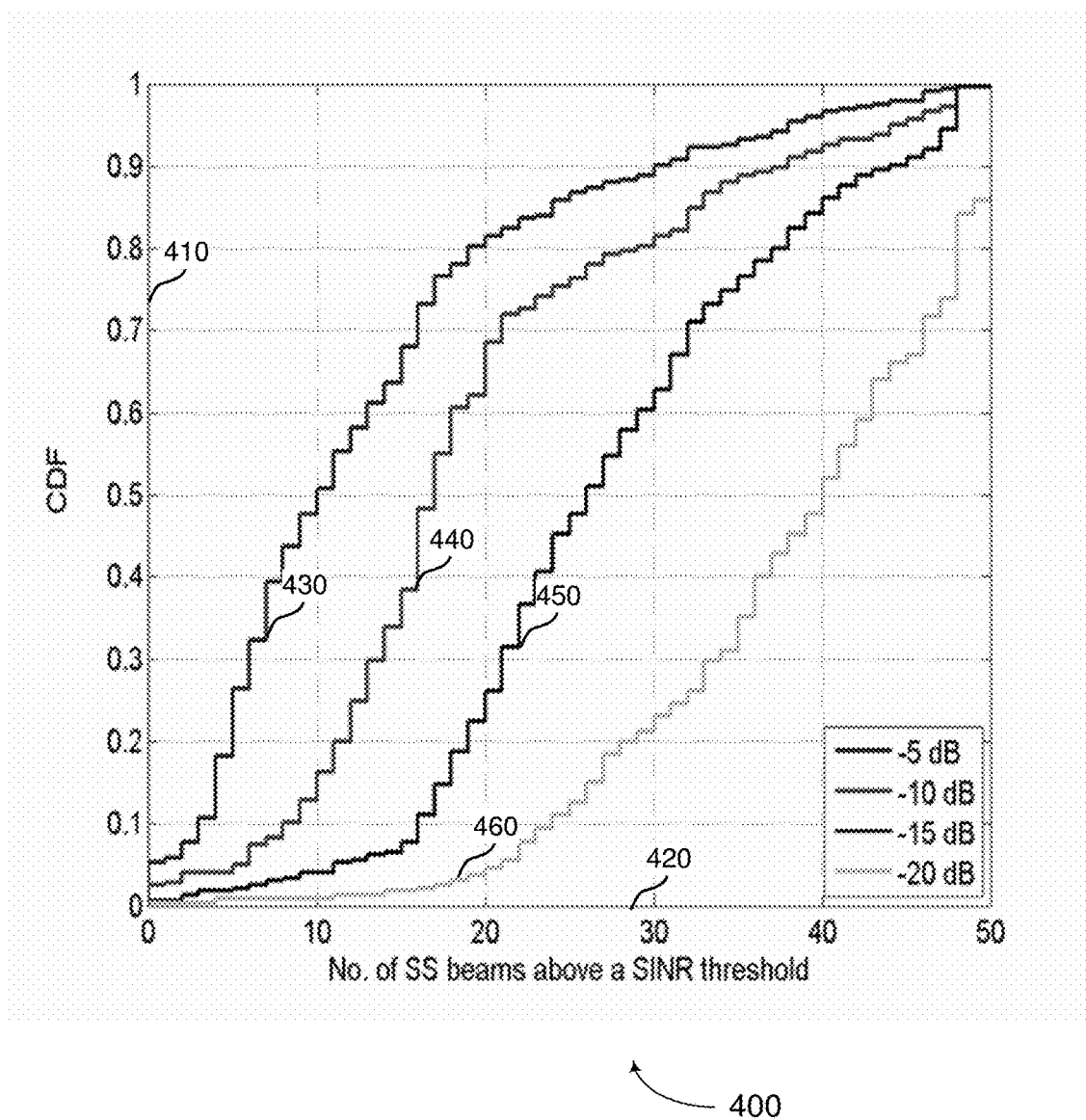
FIG. 4 illustrates an example of the number of beams available to a UE in a serving cell by received SNR threshold.

FIG. 4 illustrates a plot 400 showing a model of the number of beams available to UEs in a serving cell by received SNR threshold in an exemplary environment. In this case, a 16×4 gNB array with 16 SS training beams. The UEs are assumed to use PO receive beam. A 57 sector model using the 5G New Radio channel model was used to generate the plot 400.

Referring back to FIG. 1, plot 400 shows statistically the number of SS beams that may be available to the UEs 115a in a single serving cell coverage area 110-a from a single gNB 105-a. The cumulative distributions function 410 of the number of SS beams that can be received above various SINR thresholds 420 is shown (i.e. −5 dB, −10 dB, −15 dB and −20 dB). It is apparent from plot 400 that many UE 115 in a single cell coverage area 110-a may have a large amount of beams that may be suitable for tracking and use in case of blockage. For example, without UE side beamforming the −15 dB PO SINR threshold (−6 dB with UE beamforming), over seventy five percent of UEs would have more than 30 useful beams. This is a large amount of beams to track, requiring a large amount of modem and RF power. Accordingly, it can be appreciated that in many cases a UE may only want to select a subset of these beams for subsequent tracking and use.

Figure 5:
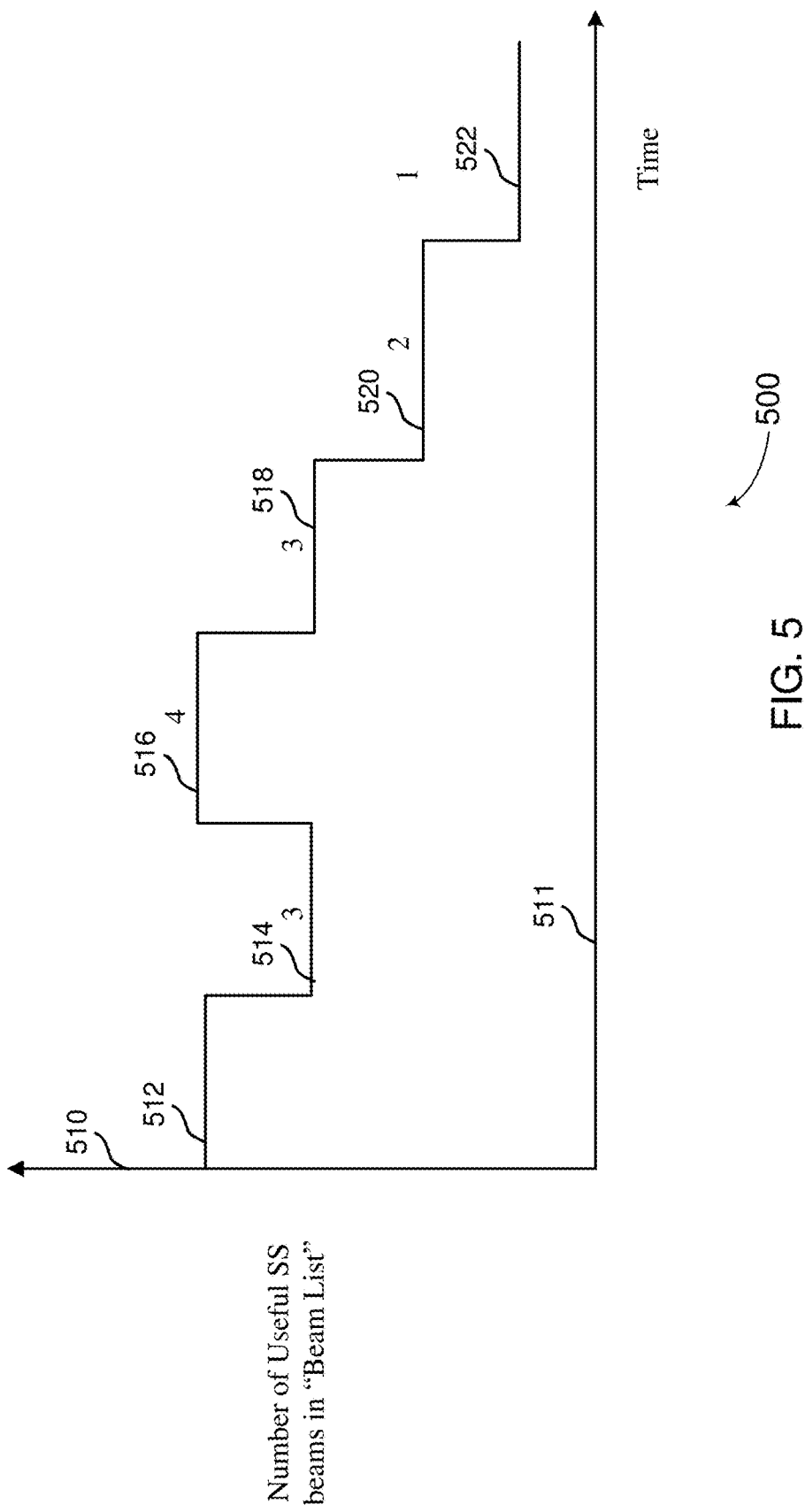
FIG. 5 illustrates an example of the number of useful beams on a beam list that might be available to a UE over time.

FIG. 5 illustrates an example profile 500 of the number of useful beams on a beam list that might be available to a UE over time 511. In this example, a beam list may have been generated using a beam training procedure. The UE may have selected four beams for inclusion on the beam list by selecting the beams with the greatest SINR for example. The beam list may initially have four beams that are subsequently actively tracked by the UE during a first time interval 512. During the first time interval 512 one of the beams may be blocked or otherwise rendered not useful. The UE may then have three suitable beams available during a second time interval 514. The UE, still tracking the beams on the beam list, may discern that the one beam that was blocked during the first time interval 512 has once again available. Thus the UE will have four suitable beams available while tracking during a third time interval 516. Once again, a single beam on the beam list may be blocked and the UE will have three beams available during a fourth time interval 518. Then a second beam may be blocked, and the UE will have only two suitable beams available during a fifth time interval 520. Finally, a third beam may become blocked leaving only a single suitable beam available during a sixth time interval 522.

It can be appreciated, that as the number of suitable beams becomes low that it may be of benefit to do another beam training procedure and generate another beam list. In one aspect, a threshold is used to determine when to do another beam training procedure. For example, when the number of useful beams in the beam list falls below two, the UE may execute another beam training procedure. In this example the UE would begin beam training during the sixth tracking interval 522. Multiple beam trainings may take place to ensure a minimum number of beams stay populated on the list.

In various aspects, the threshold may be determined by the UE. The UE may set the threshold based on many factors including a number of active UEs in the cell, a UE's mobility as determined by the gNB, a geometry of the cell served by the gNB, or a default parameter. In other aspects the gNB may determine the threshold or communicate information for determining the threshold to the UE. This might include for example a number of active UEs in the cell, a UE's mobility as determined by the gNB, a geometry of the cell served by the gNB or a default parameter.

Figure 6:
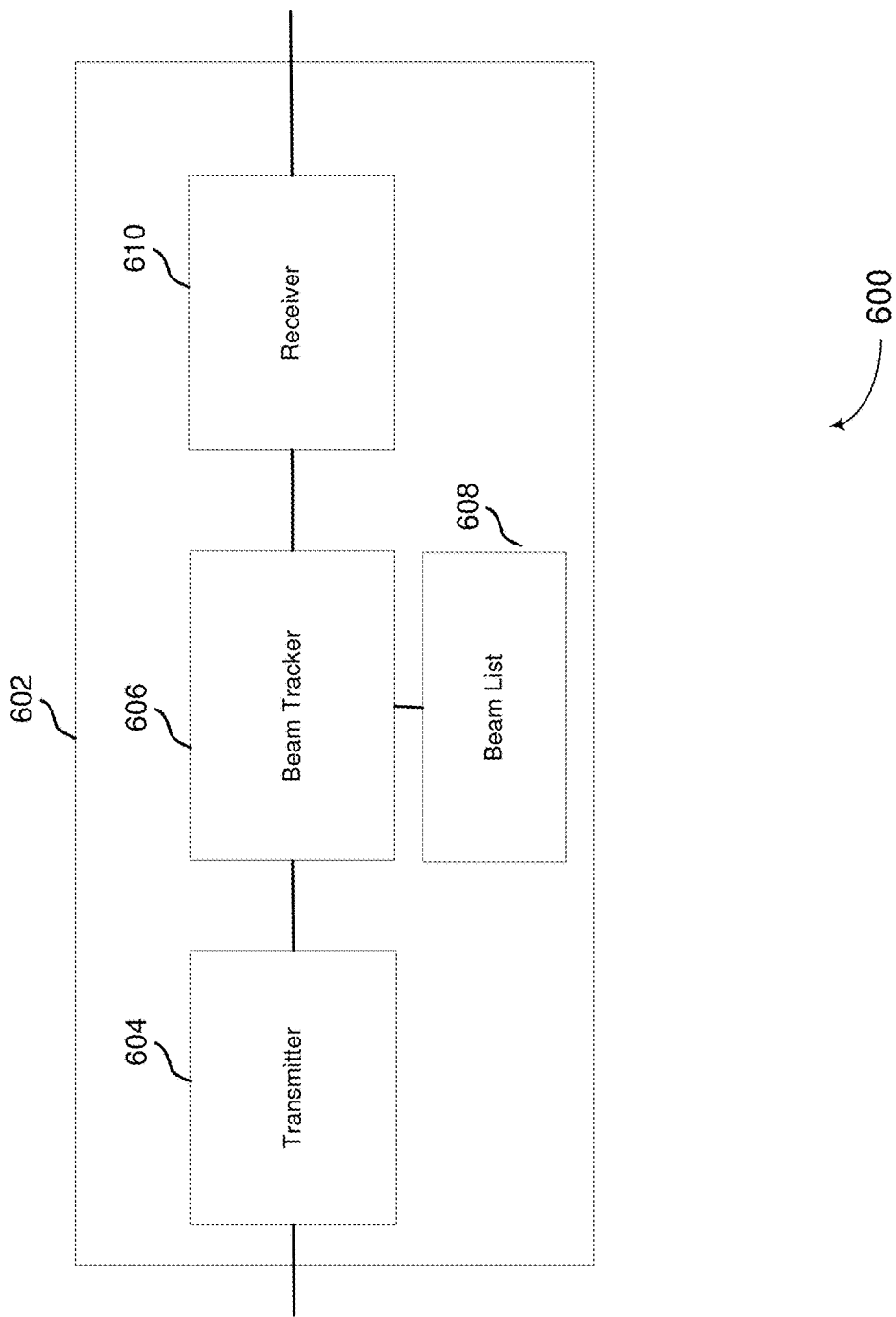
FIG. 6 a block diagram of a UE according to an aspect of the present disclosure.

FIG. 6 a block diagram 600 of a UE 602 according to an aspect of the present disclosure. A transmitter 604 is coupled to a beam tracker 606 and receiver 610. The beam tracker 606 may be configured to generate a beam list 608.

The receiver 610 may receive one or more SS blocks from one or more gNB. The receiver 610 may systematically scan through multiple receive beams and decode sequences. The receiver may also determine SINR ratios. The beam associated with SS block and the receive beam forming a beam pair. The beam tracker 606 determines which beam pairs should be placed on a beam list 608 for subsequent tracking refinement and reporting. The beam tracker 606 may determine which beams to place on the beam list based on various criteria. The criteria may be determined by the UE or by information received from a gNB. Transmitter 604 may be used by the beam tracker for reporting information to the gNB or for making requests such as a request for using a coarser code book.

Figure 7:
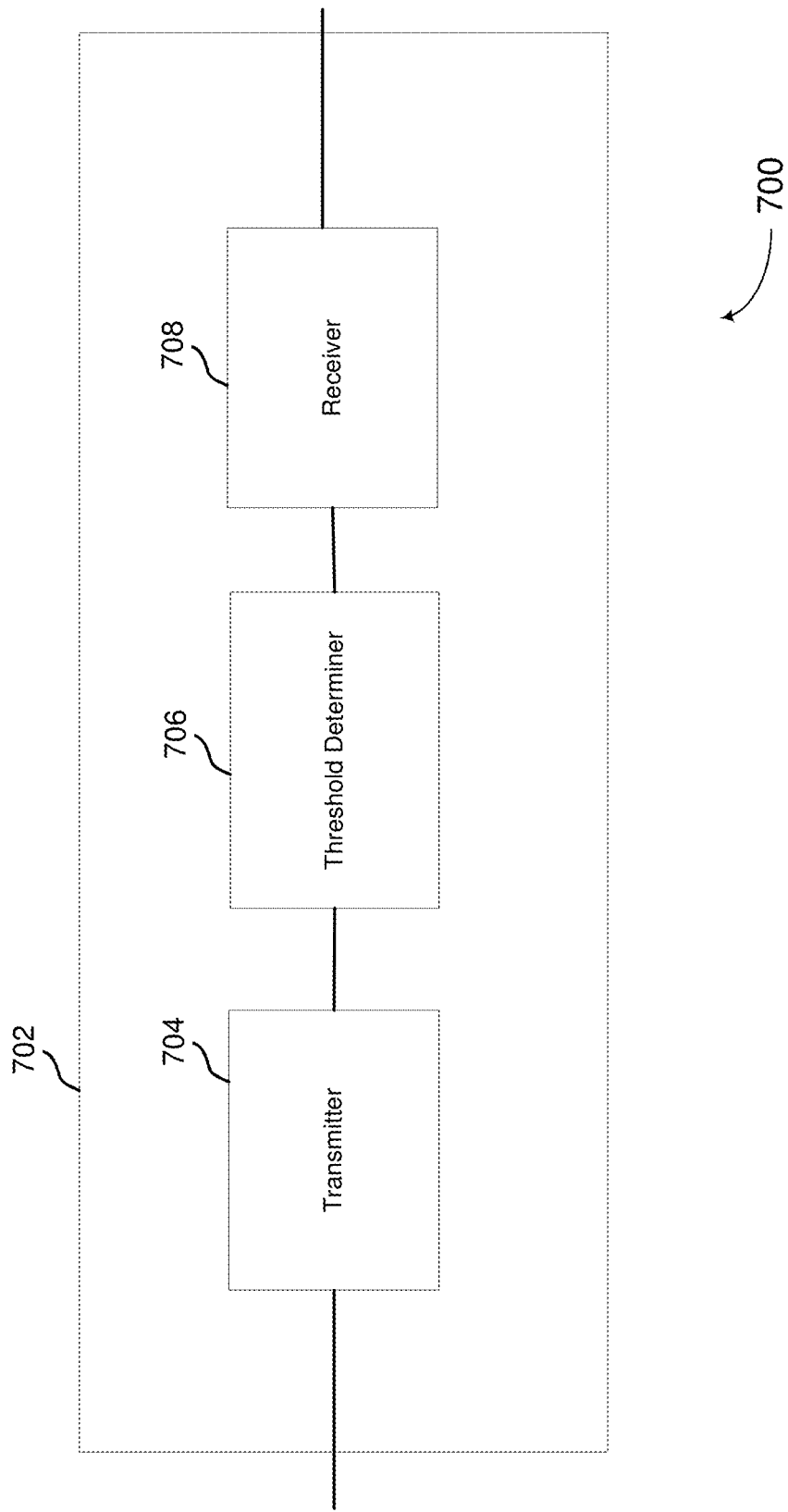
FIG. 7 illustrates a block diagram of gNB according to an aspect of the present disclosure.

FIG. 7 illustrates a block diagram 700 of a gNB 702 according to an aspect of the present disclosure. A transmitter 704 is coupled to a threshold determiner 706. The threshold determiner 706 is coupled to a receiver 708.

The transmitter 704 is configured to transmit SS blocks in corresponding downlink transmit beams. The transmitter 704 may transmit these SS periodically generating a downlink beam sweep over its coverage area allowing UEs to determine suitable downlink beams for receiving gNB transmissions. The gNB 706 may also feature a threshold determiner that provides information to the UE about determining the minimum number of suitable beams the UE may track without performing a new beam search procedure. The receiver 708 may also receive requests from one or more UEs, such as a request to use a coarser code book.

Figure 8:
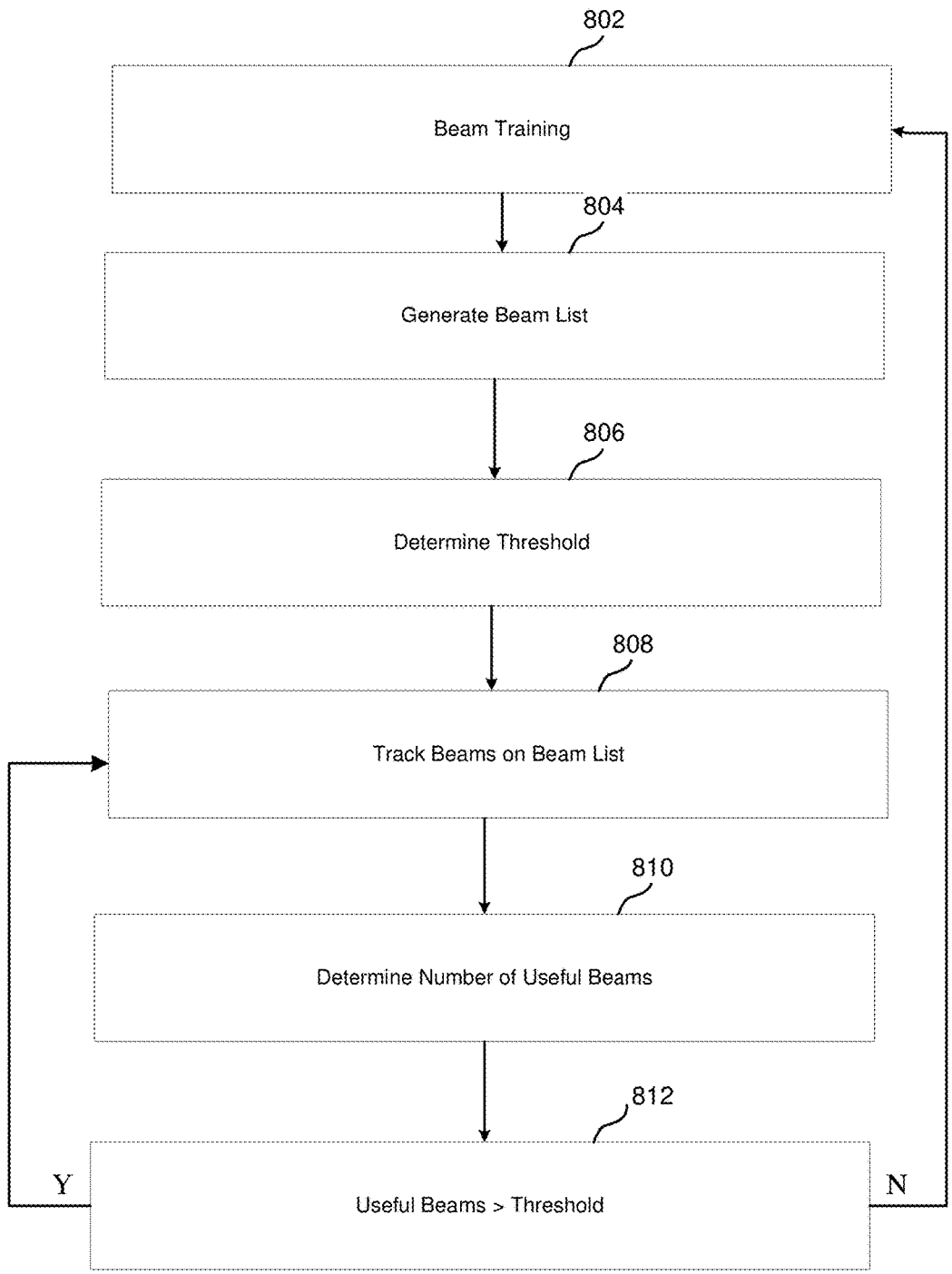
FIG. 8 illustrates an exemplary flow diagram of mmW beam tracking function in a UE.

FIG. 8 illustrates an exemplary flow diagram of mmW beam tracking function in a UE. A UE may perform beam training 802 to determine which SS blocks corresponding to downlink transmit beams the UE can receive. The UE may use a PO beam or may sequence through directional receive beams. The downlink transmit beam and the receive beam forming a beam pair. In one aspect, the UE may listen on one directional receive beams as a gNB transmits successively on each of its downlink beams. Then the UE may switch to another directional receive beam as the gNB transmits on each of its downlink beams. The UE may then switch to the next directional receive beam and repeat successively until all receive beams have been scanned.

The UE may then generate a beam list 804. The UE may select beams for the beam list based on a variety of criteria. SINR may be a one of the criteria with the UE not including beams with low SINR on the beam list 804. Other criterion as discussed previously may be used to determine whether a beam is placed on the beam list (e.g. Reference Signal Receive Power (RSRP). Reference Signal Receive Quality (RSRQ), Received Signal Strength Indication (RSSI), and/or Signal to Noise Ratio (SNR).

The UE may also determine a threshold 806 for the minimum number of suitable beams that it should have available. The threshold may be based on mobility measurements, local geometry, environment information, sensor feedback, RF power consumption, and/or thermal overshoot, among other things. The UE may also receive information about the threshold from a serving cell. This information may include, a threshold, a number of active UEs in the cell, a UE's mobility as determined by the gNB, a geometry of the cell served by the gNB, and/or a default parameter among other things.

The UE may then track beams on the beam list 808. Tracking may include beam refining and reporting. By tracking multiple beams the UE may be able to quickly transition to a suitable beam if the beam or beams being used for communication are blocked or become unavailable.

The UE may also determine the number of useful beams 810 on the beam list. As beams on the beam list become blocked or unavailable the UE may continue to track them in case they become available once again. As long as the threshold number of beams is still available the UE may continue to track the beams on the beam list.

The UE may also determine whether the number of useful beams is greater than the threshold 812. If it is not, the flow reverts back to beam training 802 so that the UE may generate a new beam list. The UE may perform this step continually or periodically.

Figure 9:
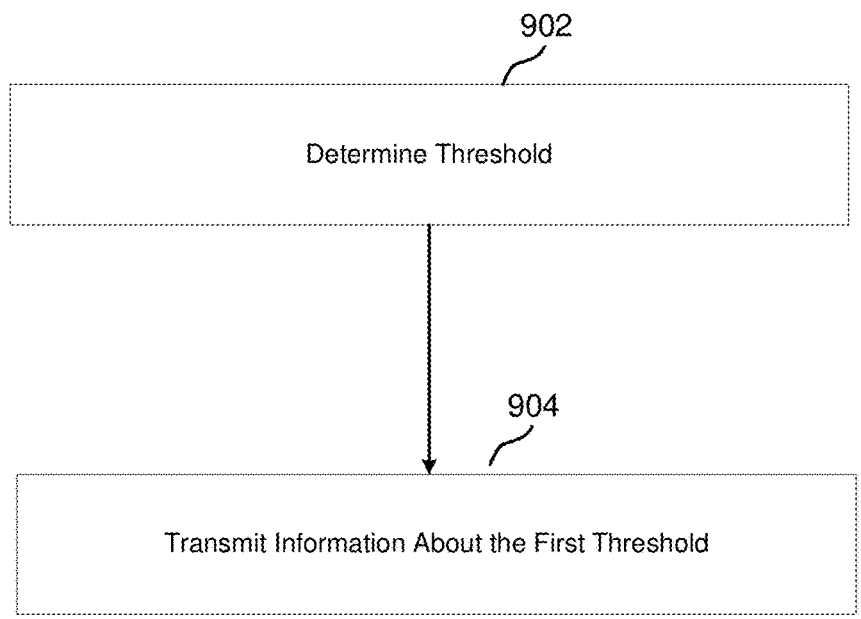
FIG. 9 illustrates an exemplary flow diagram of gNB function for generating a UE beam tracking threshold.

FIG. 9 illustrates an exemplary flow diagram of gNB function for generating a UE beam tracking threshold. The gNB may outright determine a threshold 902 that the UE should use for beam tracking purposes. The threshold may be the minimum number of suitable beams that a UE should have available in case of blockage or in case a current link becomes unavailable. In other aspects the gNB does not calculate the threshold but provides information to the UE that would be helpful in determining a threshold. Some information used by the gNB (or UE) to compute the threshold may be a number of active UEs in the cell, a UE's mobility as determined by the gNB, a geometry of the cell served by the gNB or a default parameter.

Finally, the gNB may transmit the threshold or information about the threshold to the UE 904.

Figure 10:
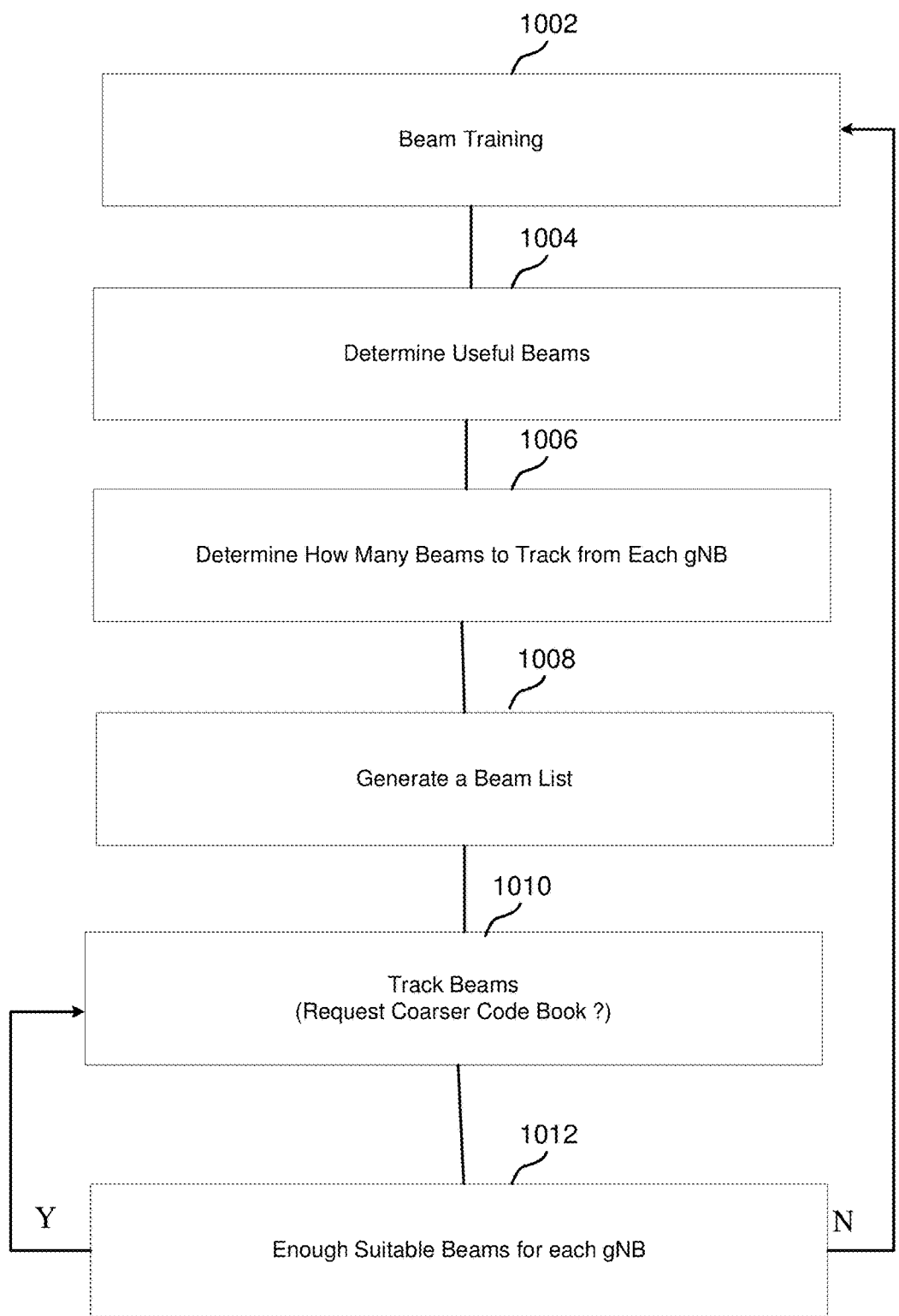
FIG. 10 illustrates an exemplary flow diagram of mmW beam tracking function in a UE.

FIG. 10 illustrates an exemplary flow diagram of mmW beam tracking function in a UE. The UE may perform beam training 1002. In one aspect, multiple gNBs transmit their SS blocks corresponding to downlink beams, simultaneously. The UE may use a PO beam or may sequence through directional receive beams. The downlink transmit beam and the receive beam forming a beam pair. The UE may decode the symbol sequence on the beams to determine the SINR.

In one aspect, the UE may listen on one directional receive beams as a gNB transmits successively on each of its downlink beams. Then the UE may switch to another directional receive beam as the gNB transmits on each of its downlink beams. The UE may then switch to the directional receive beam and repeat successively until receive beams have been scanned.

The UE may then determine the useful beams 1004. The useful beams may be from one or more gNBs. Useful beams may be beams with a SINR that is above a minimum threshold.

The UE may then generate a beam list 1008 comprised of useful beams that may be used for communication. The beams selected for the beam list may be based on one or more criteria. In some aspects, the UE may put beams from multiple gNBs on its beam list providing rate and spatial diversity. In some aspects, serving cell beams on the beam list may be limited to a small number (e.g. 1 to 3 beams). These beams might be chosen for example to correspond to UE beams in different subarrays indicating correspondence to other clusters in the channel. In some aspects the beam list may be generated based on UE distance to the gNB transmitting the beam. The UE might for example favor beams that are a short distance to the gNB with the number of beams from each gNB being an inverse function of the distance. Various techniques such as triangulation may be used to estimate distances.

The beam list may also be populated using other criteria. For example, the UE may favor beams that allow for detection and reasonable demodulation performance with pseudo-omnidirectional (PO) beams allowing the UE to save power.

The UE may than track beams on the beam list 1010. Tracking may include beam refining and reporting. By tracking multiple beams the UE may be able to quickly transition to a suitable beam if the beam or beams being used for communication are blocked or become unavailable.

In some aspects, the UE may also request that a gNB use a coarser codebook reducing the UE power requirements and Adjacent Channel Leakage Ratio (ACLR) levels.

The UE may then determine if there are enough suitable beams available for each gNB 1012. If there are, the gNB may continue to track the beams. If not, flow reverts to beam training 1002 allowing the gNB to generate a new beam list 1008.

Figure 11:
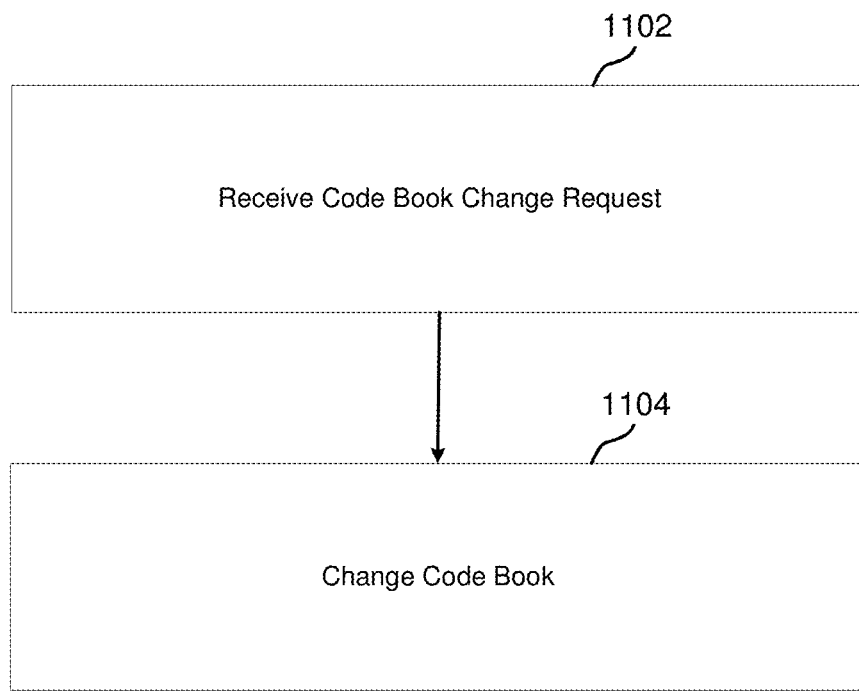
FIG. 11 illustrates an exemplary flow diagram of gNB function for changing a code book.

FIG. 11 illustrates an exemplary flow diagram of gNB function for receiving a request to change an SS code book. A gNB may receive a code book change request 1102 from one or more UEs. The code book change request might indicate that the UE would like the gNB to transmit using a coarser code book allowing the UE to receive with a PO beam or wider beam saving energy. The gNB in turn may change the code book 1104 in response to the request.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of operating a user equipment (UE) comprising:
    performing a beam training procedure to determine useful beams;
    generating a first beam list by selecting a plurality of useful beams, the first beam list including a first number of beams from a first gNB and a second number of beams from a second gNB;
    tracking the beams on the first beam list and determining a number of useful beams on the beam list; and
    performing another beam training procedure when the number of useful beams falls below a threshold.

2. The method of claim 1 wherein in generating the first beam list, the beams are selected based on a Reference Signal Received Power (RSRP), a Reference Signal Received Quality (RSRQ), a Reference Signal Strength Indicator (RSSI), a Signal to Interference and Noise Ratio (SINR), or a Signal to Noise Ratio (SNR) threshold.

3. The method of claim 1 wherein the first gNB is a serving cell and the first number of beams is less than the second number of beams.

4. The method of claim 3 wherein the first number of beams is zero.

5. The method of claim 1 wherein the first number of beams and the second number of beams is based in part on corresponding gNB distances to the UE.

6. The method of claim 1 wherein the first number of beams is a function of the UE receiving beam's beam-width.

7. The method of claim 1 further comprising sending a request to the first gNB to perform a beam sweep with a coarser codebook.

8. A user equipment (UE) comprising:
a receiver configured to receive downlink signals; and
a processor configured to:
perform a beam training procedure to determine useful beams; and
generate a first beam list by selecting a plurality of useful beams, the first beam list including a first number of beams from a first gNB and a second number of beams from a second gNB;
track the beams on the first beam list and determine a number of useful beams on the beam list; and
perform another beam training procedure when the number of useful beams falls below a threshold.

9. The UE of claim 8 wherein in generating the first beam list, the beams are selected based on a Reference Signal Received Power (RSRP), a Reference Signal Received Quality (RSRQ), a Reference Symbol Signal Indicator (RSSI), a Signal to Interference and Noise Ratio (SINR), or a Signal to Noise Ratio (SNR) threshold.

10. The UE of claim 8 wherein the first gNB is a serving cell and the first number of beams is less than the second number of beams.

11. The UE of claim 10 wherein the first number of beams is zero.

12. The method of claim 8 wherein the first number of beams and the second number of beams is based in part on corresponding gNB distances to the UE.

13. The UE of claim 8 wherein the first number of beams is a function of the UE receiving beam's beam-width.

14. The UE of claim 8 wherein the processor is further configured to send a request to the first gNB to perform a beam sweep with a coarser codebook.

15. A user equipment (UE) comprising:
means for performing a beam training procedure to determine the useful beams; and
means for generating a first beam list by selecting a plurality of useful beams, the first beam list including a first number of beams from a first gNB and a second number of beams from a second gNB;
means for tracking the beams on the first beam list and means for determining a number of useful beams on the beam list; and
means for performing another beam training procedure when the number of useful beams falls below a threshold.

16. The UE of claim 15 wherein in generating the first beam list, the beams are selected based on a Reference Signal Received Power (RSRP), a Reference Signal Received Quality (RSRQ), a Reference Symbol Signal Strength (RSSI), a Signal to Interference and Noise Ratio (SINR), or a Signal to Noise Ratio (SNR) threshold.

17. The UE of claim 15 wherein the first gNB is a serving cell and the first number of beams is less than the second number of beams.

18. The UE of claim 17 wherein the first number of beams is zero.

19. The UE of claim 15 wherein the first number of beams and the second number of beams is based in part on corresponding gNB distances to the UE.

20. The UE of claim 15 wherein the first number of beams is a function of the UE receiving beam's beam-width.

21. The UE of claim 15 further comprising means for sending a request to the first gNB to perform a beam sweep with a coarser codebook.

* * * * *